United States Patent [19]

Dobbins

[11] 4,292,739
[45] Oct. 6, 1981

[54] LIQUID MEASURE DIP STICK

[76] Inventor: Hugh L. Dobbins, 110 Aspenwood Dr., Riverdale, Ga. 30296

[21] Appl. No.: 63,576

[22] Filed: Aug. 3, 1979

[51] Int. Cl.³ .............................................. G01B 5/18
[52] U.S. Cl. .............................. 33/126.4 R; 73/864.63
[58] Field of Search .................... 33/126.7 R, 126.7 A, 33/126.4 R, 126.4 A; 73/425.4 R, 323; 106/163 R; 536/65; 428/36, 918; 138/177

[56] References Cited

U.S. PATENT DOCUMENTS

| | | | |
|---|---|---|---|
| 1,594,210 | 7/1926 | Mann | 33/126.4 R |
| 2,040,701 | 5/1936 | Marsden | 73/425.4 R |
| 2,237,222 | 4/1941 | Flynn | 536/65 |
| 2,373,630 | 4/1945 | Martin | 536/65 |
| 2,701,919 | 2/1955 | Anderson | 33/126.4 R |
| 3,199,199 | 8/1965 | Harrell | 73/425.4 R |
| 3,380,168 | 4/1968 | Holden | 33/126.4 R |

*Primary Examiner*—Gerald Goldberg
*Assistant Examiner*—Denis E. Corr
*Attorney, Agent, or Firm*—Cushman, Darby & Cushman

[57] ABSTRACT

A dip stick for measuring the amount of liquid in a deep container such as a gasoline storage tank. The dip stick includes a long, transparent tube mounted to a wooden stick, a linear scale for indicating the height of liquid in the tube, a valve element disposed at the bottom portion of the tube and a wire extending from the valve element through the tube to the top of the tube. Structure is provided at the top of the tube for raising and lowering the wire and the valve element to close the portal. After inserting the dip stick into the tank and closing the tube portal, the volume of liquid in the tank is determined by viewing the height of liquid in the tube.

7 Claims, 15 Drawing Figures

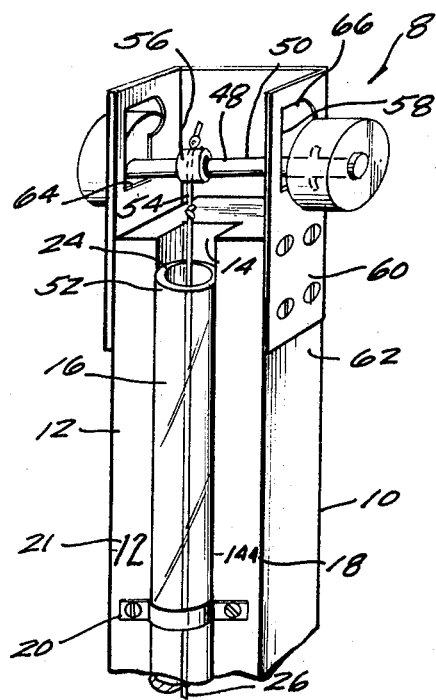
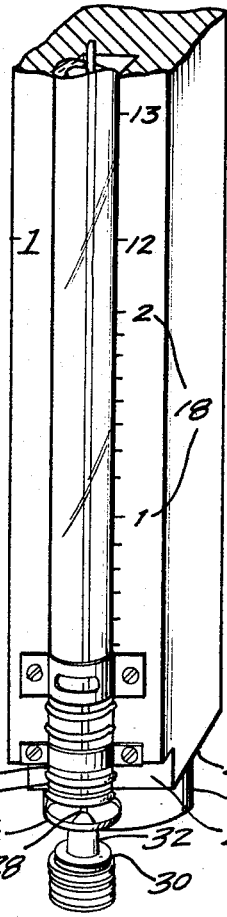
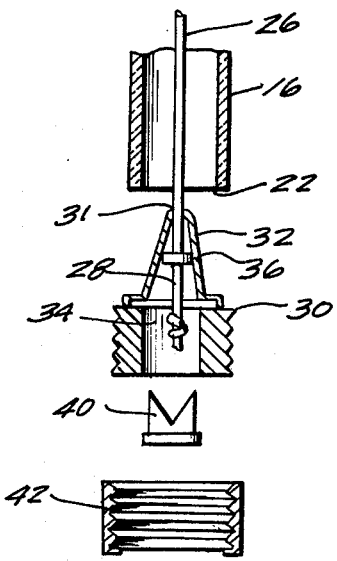
Fig. 2
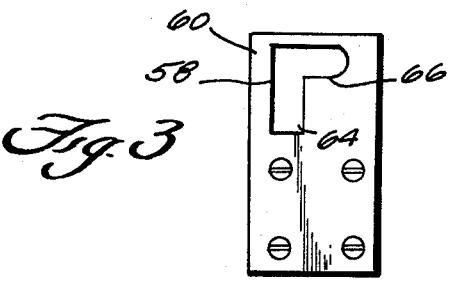
Fig. 3
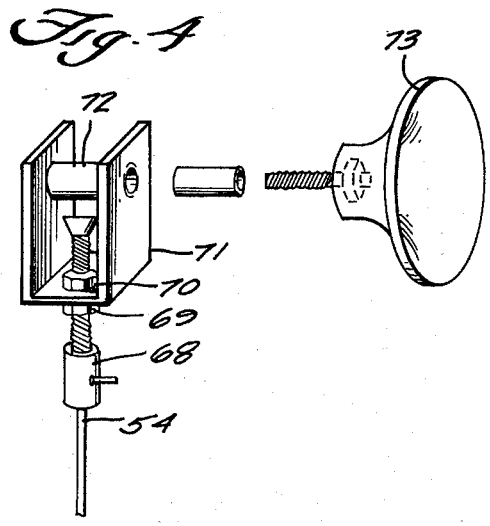
Fig. 4
Fig. 1

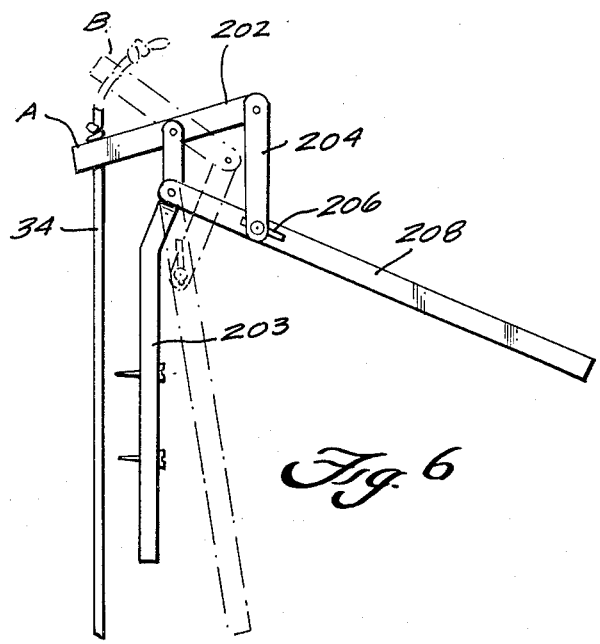
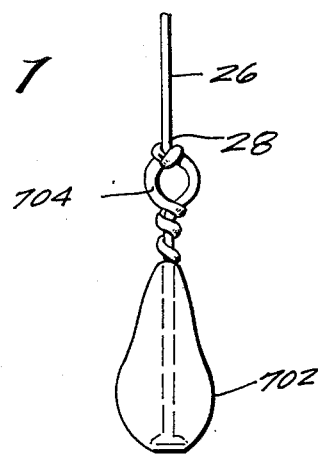
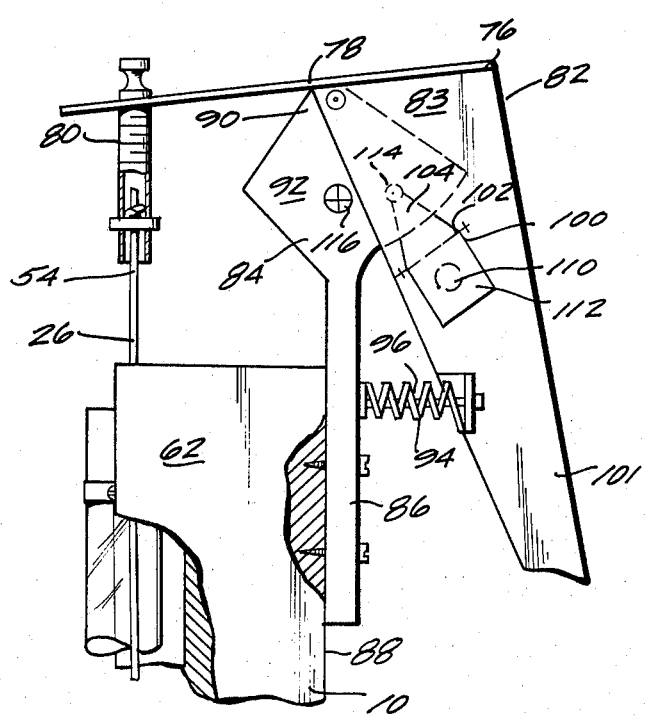

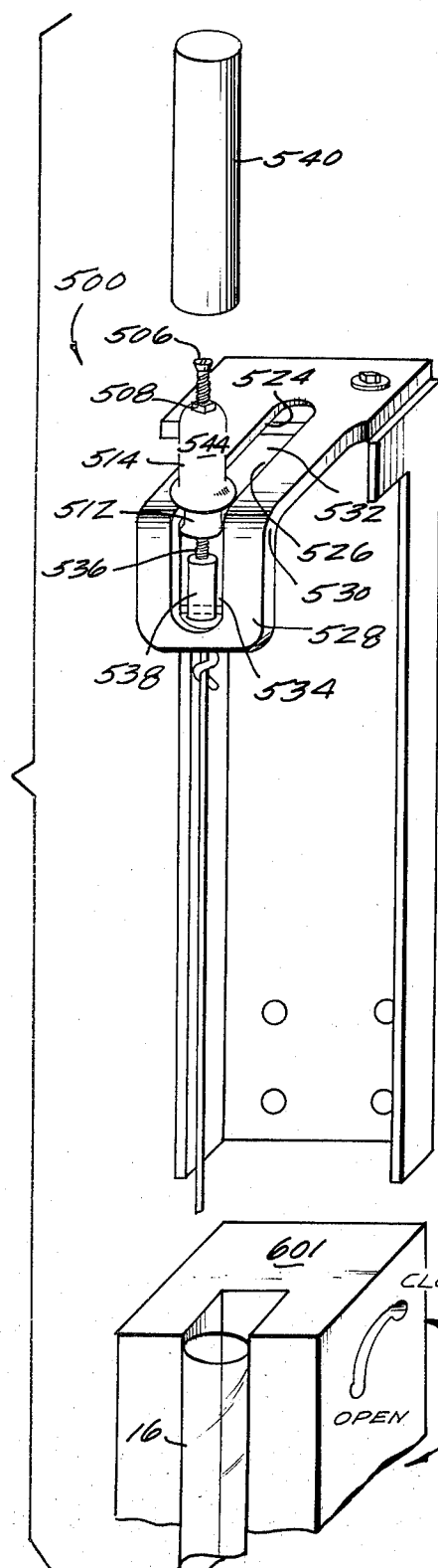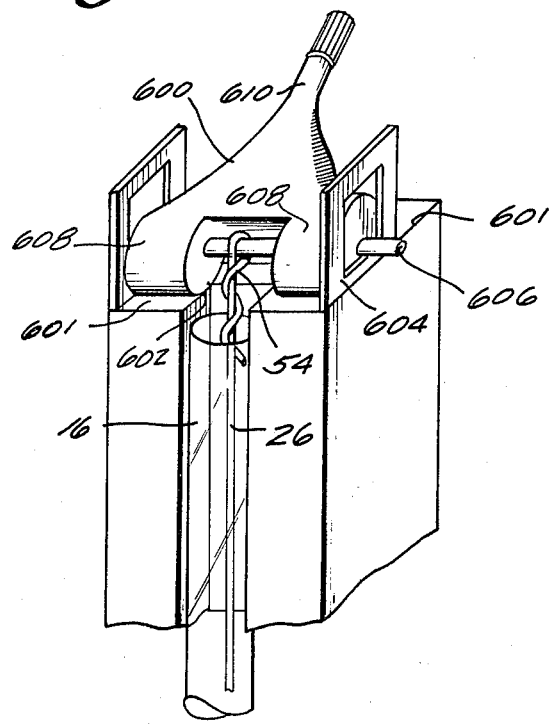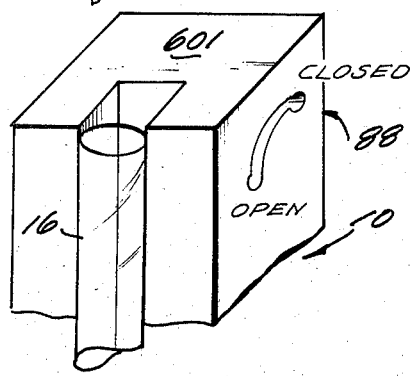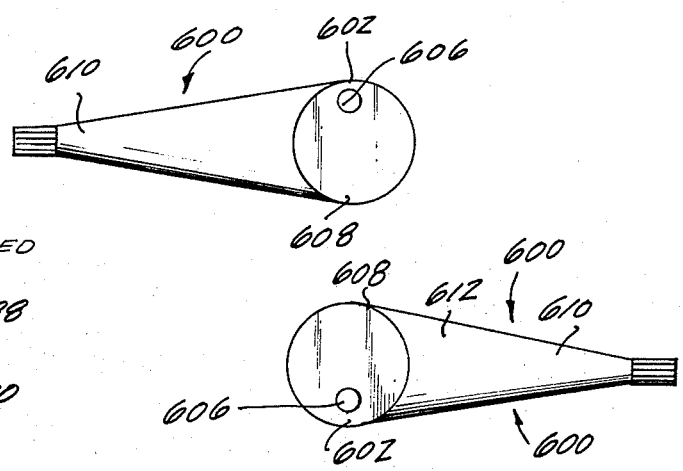

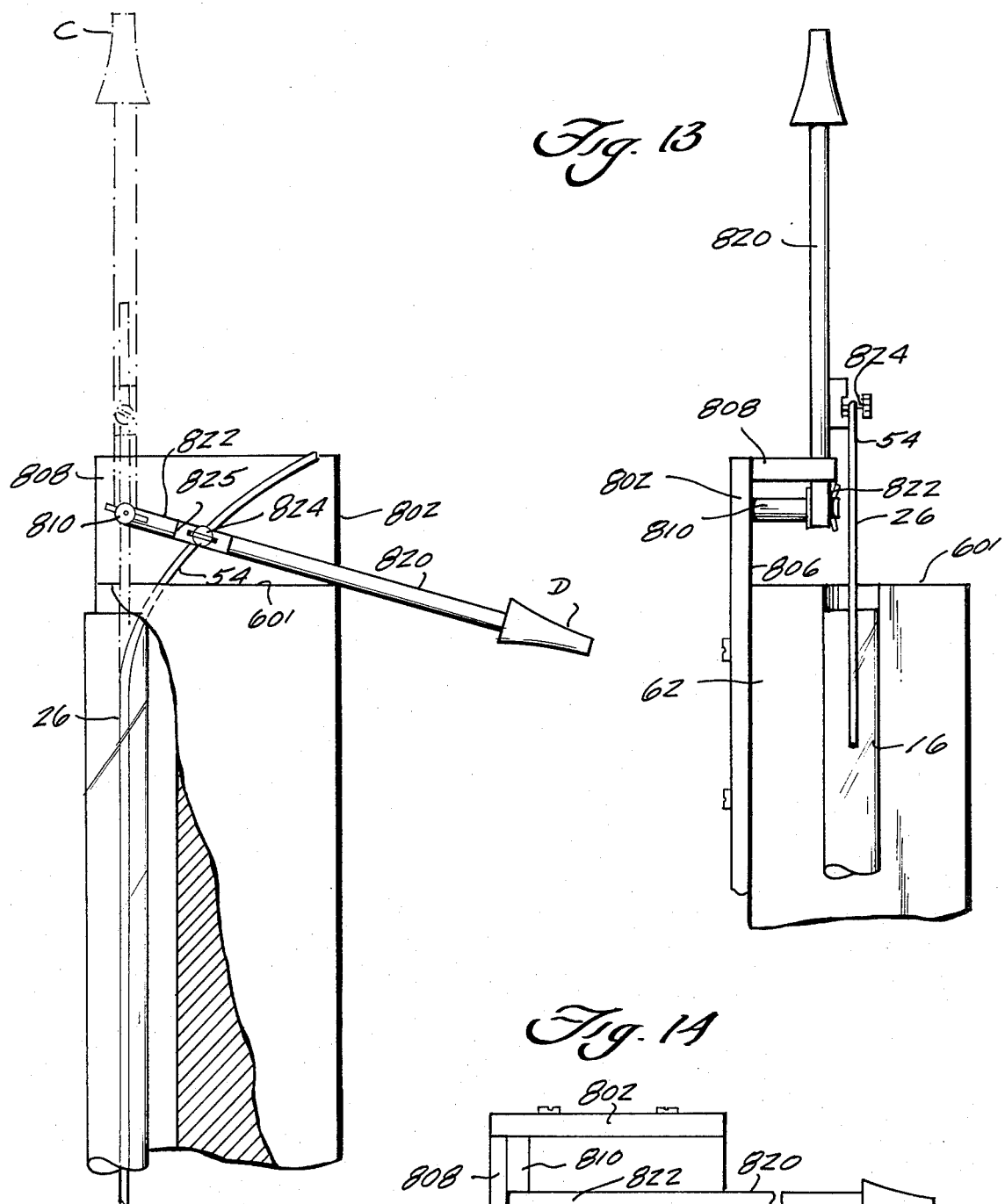

LIQUID MEASURE DIP STICK

BACKGROUND AND SUMMARY OF THE INVENTION

The invention relates to liquid volume measurement and more particularly to a dip stick for measuring the amount of liquid in a deep container such as a gasoline storage tank.

Service station gasoline and diesel fuel storage tanks are normally set underground and are over 10 feet deep. In order to measure the amount of liquid in the tank at any time, a long stick-like structure may be inserted down from the top of the tank and then removed and examined. Conventional dip sticks in current use are constructed entirely of a solid strip of wood which shows discoloration or wetness for some period of time over that portion of the stick which has been submerged in the liquid. The stick is normally calibrated so that the height of the liquid may be accurately determined at the boundary of wetness to dryness as indicated by the temporary discoloration. A conversion table is used to determine the quantity of liquid in the tank for the determined height.

Conventional dip sticks have a number of disadvantages. After repeated use, a permanent discoloration develops which makes accurate reading increasingly difficult. This may be caused by the chemistry of the liquid or colored residue of the liquid which is absorbed by the dip stick. Also, during wet weather, the wood dip stick may become wet causing a discoloration which makes the wet to dry boundary on the dip stick difficult to see. Another disadvantage of currently used dip sticks is the necessity of waiting for the dip stick to dry before it can be used again. Such dip sticks therefore cannot be used to successively measure the amount of liquid in a number of tanks during a short time period. Also, since prior dip sticks generally rely upon the surface attraction between the wood material and the liquid, they are generally not as useful and accurate for measuring volumes of liquids where the surface attraction is low.

These and other disadvantages are overcome by the present invention. The dip stick of the present invention consists, in the preferred embodiment, of a long, cylindrical, transparent tube fixed in a longitudinal groove in the side of a strip of wood; the wood, except for the groove, having the composition, shape, size and calibrated height indicia of a conventional dip stick.

A portal (valve seat) at one end (the bottom) of the tube is opened and closed by plug-like valve piece which is suspended below the portal by a non-corrosive wire which passes through the tube to an opening at the top of the tube. Means for pulling upward on the wire to lift the valve piece and seal the bottom portal is provided at the top opening. A leverage handle is suitably mounted to the top of the wood strip for this purpose. A contraction spring mounted to the bottom of the tube biases the valve piece away from the bottom portal to keep the bottom portal open except when the valve piece lifting means is actuated. The transparent tube is suitably composed of cellulose acetate butyrate which is impervious to gasoline and unaffected by hydrostatic pressure at depths of up to 15 feet.

The dip stick tube of the present invention provides a simple and convenient way to more accurately measure the volume of liquid in a container irrespective of weather conditions. The present invention also has the advantage of being able to accurately measure the volume of any liquid which does not cause the dip stick materials to deteriorate. The accuracy with which the present invention may measure liquid volume is not inhibited to a low surface attraction between the tube and the liquid as is the accuracy of conventional dip sticks.

BRIEF DESCRIPTION OF THE DRAWINGS

Other objects, features and advantages of the present invention will be obvious from the following description when taken in conjunction with the illustrative embodiments of the accompanying drawings in which:

FIG. 1 is a perspective view of the liquid measuring dip stick, in one form of embodiment;

FIG. 2 is an exploded view of the valve portion of the embodiment shown in FIG. 1;

FIG. 3 is an elevated view of a bracket of the handle illustrated in FIG. 1;

FIG. 4 is an exploded perspective view of the handle portion of a second embodiment of the invention;

FIG. 5 illustrates a leverage handle portion of a third embodiment of the present invention;

FIG. 6 is a front elevation of another leverage handle of a fourth embodiment of the handle portion of the invention;

FIG. 7 is an elevated view of an alternate embodiment of the valve element illustrated in FIG. 1;

FIG. 8 is an elevated view in section of the handle portion of a fifth embodiment of the invention;

FIG. 9 is an exploded perspective view of the upper portion of the fifth embodiment of the invention;

FIG. 10 is a perspective view of the upper portion of a sixth embodiment of the invention;

FIGS. 11a and 11b illustrate the opened and closed positions of the handle illustrated in FIG. 10;

FIG. 12 is a side elevation in partial section of the upper portion of a seventh embodiment of the invention;

FIG. 13 is a front elevation of the embodiment of the invention illustrated in FIG. 12; and FIG. 14 is a plan view of the embodiment of the invention illustrated in FIGS. 12 and 13.

DETAILED DESCRIPTION OF THE PREFERRED EMBODIMENT

Referring first to FIG. 1, the dip stick of the present invention, generally identified by the numeral 8, suitably includes an elongated stick 10 suitably composed of banak wood. The stick 10 should be typically 14 feet long and have a square cross-section $\frac{7}{8}'' \times \frac{7}{8}''$. Along the front face 12 of the stick 10, is a groove 14 running the full length of the stick 10 in which is mounted a long, cylindrical, transparent tube 16. The tube 16 should be composed of a material which is impervious to the liquid to be measured and which will withstand the pressures to which it will be exposed when inserted in a deep tank. For a 14 foot tank of gasoline, a cellulose acetate butyrate tube having an inner diameter of $\frac{1}{4}''$ and an outer diameter of $\frac{3}{8}''$ has been found to be suitable. Along the front face 12 of the stick 10 adjacent to the groove 14 is disposed a scale 18 of suitable units, typically in inches and feet for use in the United States. Alternatively, the scale may be disposed on one of the side faces. Tube clamps 20 are suitably disposed across groove 14 adjacent to each foot marking 21 and a suitable adhesive (not shown) is placed in the groove 14 in order to fasten the tube 16 in the groove 14. Tube 16 is open at both ends, having a portal (valve seat) 22 at its bottom end and opening 24 at its top end. A non-corrosive wire 26 passes completely through the tube 16 and is attached at its bottom end 28 to a valve element 30. As is best illustrated in FIG. 2, valve element 30 is suitably composed of a plastic and has a conical top surface 32 which is insertable through portal (valve seat) 22 to seal the portal to prevent the entry or exit of any liquid. The bottom end 28 of wire 26 passes through a small hole 31 in the top surface 32 to a cavity 34 in the valve element 30. The end 28 of wire 26 passes through a washer 36 in cavity 34 and is knotted so as to secure the wire to the valve element 30. The cavity 34 is suitably sealed water-tight by a plastic plug 40 at the bottom of plastic valve 30 using an epoxy or other satisfactory adhesive. A plastic screw cap 42 can also be used to seal the valve element 30. Non-ferrous materials should be utilized throughout to avoid dangerous static peaks which can result when ferrous alloys are used.

Referring back to FIG. 1 valve element 30 is normally maintained in spaced confronting relationship with portal 22. Means for keeping portal 22 open is suitably prvided by a spring 44 mounted at the bottom end 46 of tube 16 and extending downward below portal 22 and surrounding portal 22. Means for protecting the valve element 30 and spring 44 from damage due to physical contact with other objects, suitably a cavity 47 in stick 12 surrounding the bottom end 16 of tube 46 and a plastic base element 45, are disposed at stick bottom 49 so that valve element 30 is somewhat recessed and will not extend vertically beyond base 45 even when portal 22 is open. The portal 22 may be closed by lifting valve element 30. Means for raising the valve element 30 to close the bottom portal 22 is provided by handle 48 having an axle 50 disposed directly above the top end 52 of tube 16 to which the wire upper end 54 is attached using a wire clamp 56. Handle 48 is supported along axle 50 in slots 58 in brackets 60 which are mounted to side surface 62 at the upper end of stick 16. As is shown in FIG. 3, slots 58 each have a lower position 64 for supporting axle 50 so that portal 22 is open. Handle 48 may also be lifted so that axle 50 rests in a second position 66 in slot 58 whereby valve element upper surface 32 is lifted to close portal 22.

In order to measure the volume of liquid in a storage tank, the dip stick 8 is inserted through an opening in the top of the tank with portal 22 open. Liquid will rise in tube 16 to the level of liquid in the tank. The portal 22 is then closed by actuating handle 48 to lift wire 26 and valve element 30 so that valve element top surface 32 seats in portal 22, closing the portal. The dip stick is then lifted at least partially from the tank and the level of the liquid in tube 16 is noted along scale 18. Handle 48 is then actuated to lower valve element 30 from portal 22 so that the liquid in tube 16 returns to the tank. The noted height on the scale 18 is then compared to a suitable conversion table to determine the volume of liquid in the tank.

An alternative to handle 48 is shown in FIG. 4 whereby means for adjusting the tension on wire 26 is provided. In accordance with the embodiment shown in FIG. 3, upper end 54 of wire 26 is connected to a wire locking nut 68 which is mounted at its upper end by bottom locking nut 69 and top locking nut 70 to U-shaped member 71 which member is in turn mounted to an axle 72. Axle 72 is mounted in any conventional manner to handles 73 and 74 at each end thereof. In order to adjust the wire tension, with valve element 30 in its open position, the wire locking nut 68 is rotated while the bottom lock nut 69 is loosened. After the tension adjustment is made, lock nuts 69 and 70 may then be tightened.

Another alternative to handle 48 is illustrated in FIG. 5. Leverage handle 76 has a horizontal arm 78 connected at one end to wire tension adjuster 80 which is in turn attached to upper end 54 of wire 26 and rigidly connected at its other end to a substantially vertical arm 82, having a flat front surface 83. Leverage handle 76 is pivotally mounted to the upper end of stick 10 using a bracket 84 mounted at its bottom end 86 to the rear side surface 88 of stick member 10. Bracket 84 includes an upper portion 90 having a surface 92 parallel to stick side surface 62. Leverage handle 76 is pivotally mounted along the upper portion of surface 92. By pushing vertical handle portion 82 clockwise, inward toward stick 10, arm 78 causes wire 26 to be raised upward thereby closing lower tube portal 22. A push spring 94 mounted on an axle 96 connecting bracket lower portion 86 to vertical arm 82 urges handle 76 counterclockwise to move arm 78 downward to open portal 22. A latch 101 is mounted to arm 82 for locking the leverage arm in the closed valve position. Latch 101 suitably includes an extended plate-shaped member 100 pivotally mounted about an axle 102. Axle 102 has its longitudinal axis in the plane of arm 82. Arm 82 has an inside end 104 pivotally urged against surface 92 by a push spring 110 mounted between vertical arm front surface 83 and extended member outside trigger portion 112. When lever vertical arm 82 is pulled inward, spring 110 causes extended member inside extruding tip 114 to fall in hole 116 in bracket upper surface 92, thereby locking the handle with the portal 22 sealed closed by valve element 30. By pushing on extended member trigger portion 112, extended member tip 114 is released from hole 116 opening the latch 101 and spring 94 urges arm 82 in a counterclockwise direction, thereby causing valve 30 to release from portal 22 to open portal 22.

In another embodiment of the leverage handle, illustrated in FIG. 6, an overcenter pivotal handle is utilized, as is well-known in the art. A first arm 202 pivotally mounted near its center to a fixed member 203 mounted to a side of stick 10 is also connected at one end to wire upper end 34. Arm 202 is pivotally mounted at its other end to arm 204. Arm 204 is in turn pivotally mounted in a short, longitudinally extending groove 206 in a third arm 208. Arm 208 is, in turn, pivotally connected at one end to fixed member 204. By raising and lowering arm 208, arm 202 is pivoted between positions A and B to open and close portal 22 as is well-known in the art.

In accordance with a further embodiment of the handle portion of the dip stick shown in FIGS. 8 and 9, a handle 500 includes an eyelet 502 having a strong push spring 504 circumferentially mounted thereon and is in turn mounted on an extended flat-headed cylindrical screw 506. Referring to FIG. 8, an adjustment bolt 508 is mounted between the screw head 510 and the top of eyelet 502. A bell-shaped piston 512 is axially mounted over spring 504. A larger bell-shaped handle head 514 is axially mounted with its top end 515 disposed between adjustment bolt 508 and the top 517 of piston 512 so that the lower circular edge portion 516 of handle head 514 is disposed above and in spaced confronting relationship with lower edge portion 518 of piston 512 forming a circular upward-extending and narrowing groove 519 between piston lower exterior surface 520 and handle head lower interior surface 522, the edge portions 516 and 518 forming a clamp as push spring 504 allows surfaces 520 and 522 to be resistably pulled apart. Referring to FIG. 9, handle 500 is mounted in the inside edges 524 of a right angle slot 526 of an L-shaped bracket 528 mounted to the rear surface 88 of stick 10 so that slot 526 is disposed above tube top opening 24. Handle and bracket elements 500 and 528 may suitably be a standard window/vent lock with a hole drilled through the eyelet 502. Rounded corner 530 of bracket 528 serves to keep handle 500 in either the upper portion 532 or the lower portion 534 of slot 526 until handle 500 is bent upward or downward around corner 530. Spring 504 resists said turning since expansion of groove 519 and compression of spring 504 is required to bend handle 500 around corner 530. The bottom 536 of screw 506 is mounted to the top 54 of wire 26 by sleeve nut 538. The handle extension 540 may suitably be slippped over the upper surface 544 of handle head 514 to provide additional leverage.

A still further embodiment of the dip stick handle is shown in FIG. 10. In accordance with this embodiment, top end 54 of wire 26 is mounted to an axle 606 which is in turn mounted to a handle 600 which is disposed on the top surface 601 of stick 10. Handle 60 may be rotated 180° between two equilibrium positions, the equilibrium positions being defined by a first surface 602 of handle 600 resting on top surface 601 of stick 10 and a second handle surface 608 resting on surface 601. Arm member 610 extends from a peripheral surface 612 of handle 600 to provide a means for easily rotating handle 600 between the described first and second positions. Axle 606 is disposed with respect to surfaces 602 and 608 so as to be disposed perpendicular to the longitudinal axis of tube 16, parallel to surfaces 602 and 608 but closer to surface 602 than to surface 608 so that wire 26 will be raised and lowered as handle 600 is rotated between the two above described positions. In this manner, the valve element 30 may be raised and lowered to close and open valve seat 22. The two positions of handle 600 corresponding to opening and closing valve element 30 are respectively illustrated in FIGS. 11a and 11b.

Another embodiment of a handle in accordance with the present invention is illustrated in FIGS. 12, 13 and 14. There is shown a bracket 802 vertically mounted to the upper side surface 62 of stick 10. Extending perpendicularly from the interior surface 806 of bracket 802 is a back stop bar 808 above stick 10 top surface 601 and approximately in the plane of stick front surface 12. Also extending perpendicularly from bracket interior surface 806 is handle axle 810 disposed below and parallel to back stop 808 and inside the center line of tube 16. A handle arm 820 is pivotally mounted at one end 822 to axle 810. Wire end 54 is fixed to a short horizontal pin 824 extending from handle arm 820 so tht wire 26 is suspended approximately along the tube longitudinal axis, when handle arm 820 is pivoted into an approximately vertical position as is illustrated in FIG. 13. Back stop 808 is disposed to support handle arm 820 at a vertical or slightly greater than vertical angle as best illustrated in FIGS. 12 and 14. Axle 810 is disposed at such a height above stick upper surface 601 that stick upper surface 601 supports handle arm 820 at an angle just beyond the horizontal as best illustrated in FIG. 12. Horizontal pin 824 to which wire top end 54 is attached is suitably mounted to handle 820 in a slot 825 for adjustment in an axial direction in order to adjjust the tension of wire 26. When horizontal pin 824 is suitably adjusted, rotation of handle arm 820 to the vertical position C shown in FIG. 12 will pull wire 820 to the vertical position C shown in FIG. 12 will pull wire 26 upward to lift valve element upper surface 32 to close portal 22. When handle arm 820 is in the substantially horizontal position D as illustrated in FIG. 12, wire 26 is lowered thereby opening portal 22.

As illustrated in FIG. 7, an alternate embodiment of valve element 30 illustrated in FIG. 1 is a teardrop-shaped element 702 with a wire loop 704 disposed on the top thereof, such as a standard fishhook sinker. A bradded wire 706 is pulled through a hole 708 in element 702 looped at the top to form a loop 704 and is fixed to end 28 of wire 26.

It will be understood that the present description is of illustrative embodiments of the present invention and the invention is not limited to the specific form shown. For example, any suitable means for raising and lowering valve element 22 can be utilized. These and other modifications can be made in the design and arrangement of the elements as will be apparent to those skilled in the art, without departing from the scope of the invention as expressed in the appended claims.

What is claimed is:

1. A liquid height measuring device vertically insertable in a petroleum product storage tank for measuring depth comprising:
    an elongated calibrated wood stick having an elongated vertical surface with a groove formed therein, said stick extending at least twelve feet;
    a transparent narrow hollow tube mounted on said groove and extending between a bottom portal and a top end;
    a valve element having an upper surface in confronting relationship with said portal;
    lifting means for moving said valve element between an open and closed position including a wire connecting at one end to said element, a bracket mounted on said stick adjacent said top end and having two spaced apart L-shaped slots, and a handle having an axle attached to the other end of said wire and movable between an upper position in said slots holding said valve element in a closed position and a lower position holding said valve element in an open position;
    spring means for biasing said valve element toward said open position.

2. A device as in claim 1, wherein said lifting means further includes a U-shaped member mounted on said axle and a screw member extending through the bottom surface of said U-shaped member, and locking nut means fixed to said other end of the wire and adjustable on said screw member for manually adjusting tension in said wire.

3. A device as in claim 1, wherein said tube is cellulose acetate butyrate.

4. Device as in claim 1 further comprising an adhesive disposed in said groove for fixing said tube in said groove.

5. A device as in claim 1 wherein said stick has a height in excess of 14 feet.

6. A device as in claim 5 wherein said height is approximately 14 feet and said stick has a cross section perpendicular to said height of $\frac{7}{8}''$ by $\frac{7}{8}''$.

7. A device as in claim 6 wherein said tube has an outer diameter of $\frac{3}{8}''$ and an inner diameter of $\frac{1}{4}''$.

* * * * *